US007673256B2

(12) United States Patent
Scott

(10) Patent No.: US 7,673,256 B2
(45) Date of Patent: Mar. 2, 2010

(54) METHOD AND APPARATUS FOR INDICATING MOBILE ELECTRONIC DEVICE STATUS OR STATE

(75) Inventor: Sherryl Lee Lorraine Scott, Toronto (CA)

(73) Assignee: Research in Motion Limited, Waterloo, ON. (CA)

( * ) Notice: Subject to any disclaimer, the term of this patent is extended or adjusted under 35 U.S.C. 154(b) by 355 days.

(21) Appl. No.: 11/393,869

(22) Filed: Mar. 31, 2006

(65) Prior Publication Data
US 2007/0234208 A1 Oct. 4, 2007

(51) Int. Cl.
*G06F 3/14* (2006.01)
*G06F 3/048* (2006.01)

(52) U.S. Cl. ...................... 715/864; 715/859

(58) Field of Classification Search ................. 715/736, 715/810, 854, 789, 811, 859, 864; 445/566
See application file for complete search history.

(56) References Cited

U.S. PATENT DOCUMENTS 5,578,817 A * 11/1996 Bidiville et al. ............ 345/176
7,155,260 B2 * 12/2006 Tanaka et al. .............. 455/566
7,181,250 B2 * 2/2007 Morishima ................. 455/566
2004/0119601 A1 6/2004 Colorado et al.
2004/0171410 A1 9/2004 Deeds
2004/0253976 A1 * 12/2004 Lin ........................ 455/550.1

FOREIGN PATENT DOCUMENTS

| EP | 1324578 A2 | 7/2003 |
| EP | 1 467 542 | 10/2004 |
| EP | 1 489 483 | 12/2004 |

* cited by examiner

*Primary Examiner*—Weilun Lo
*Assistant Examiner*—Truc T Chuong
(74) *Attorney, Agent, or Firm*—Borden Ladner Gervais LLP; Jeffrey W. Wong

(57) ABSTRACT

Apparatus for indicating mobile electronic device status comprising a database for storing mobile electronic device status information and associated color information; a set of light emitting diodes (LEDs); a processor for retrieving the color information based on the mobile electronic device status and transmitting a signal based on the color information to the set of LEDs; wherein the set of LEDs provide a light corresponding to the color information to illuminate an area of the mobile communication device to indicate the mobile electronic device status.

12 Claims, 3 Drawing Sheets

METHOD AND APPARATUS FOR INDICATING MOBILE ELECTRONIC DEVICE STATUS OR STATE

FIELD OF THE INVENTION

The present invention relates generally to mobile electronic devices. More particularly, the present invention relates to a method and apparatus for indicating mobile electronic device status and/or state.

BACKGROUND OF THE INVENTION

The use of mobile electronic, or communication devices has increased dramatically over recent years as users wish to be able to be stay connected when they are away from a landline telephone or desktop computer. Some mobile communication devices also serve as a personal digital assistant for tracking meetings and daily activities. For users who are on the go, ease of use and speed are typical priorities. As speed is important, users typically start to use their device without verifying the status of the device since they are so concentrated on making a call, checking email or their calendar, among other things.

There are times when users attempt to use their mobile communication device while the device is in a locked mode. Frustration sets in once the user realizes that their mobile electronic device is in the locked mode and has to be unlocked for the user to use the device.

Typically, users are required to look at their display screen in order to determine the status, or state, of their device. This is, however, not an easy task since the user has to focus on what is being displayed on the display screen and divert their attention away from other tasks at hand. With the size of the screens in mobile communication devices, this information may not be immediately available to the user without having to stare intently at the screen for a few seconds. Furthermore, information concerning the device state, or status, is not readily available to the user.

It is, therefore, desirable to provide a novel method and apparatus for indicating mobile communication device status.

BRIEF DESCRIPTION OF THE DRAWINGS

Embodiments of the present invention will now be described, by way of example only, with reference to the attached Figures, wherein.

DETAILED DESCRIPTION

Generally, a method and system for indicating mobile electronic device status is provided.

Figure 1:
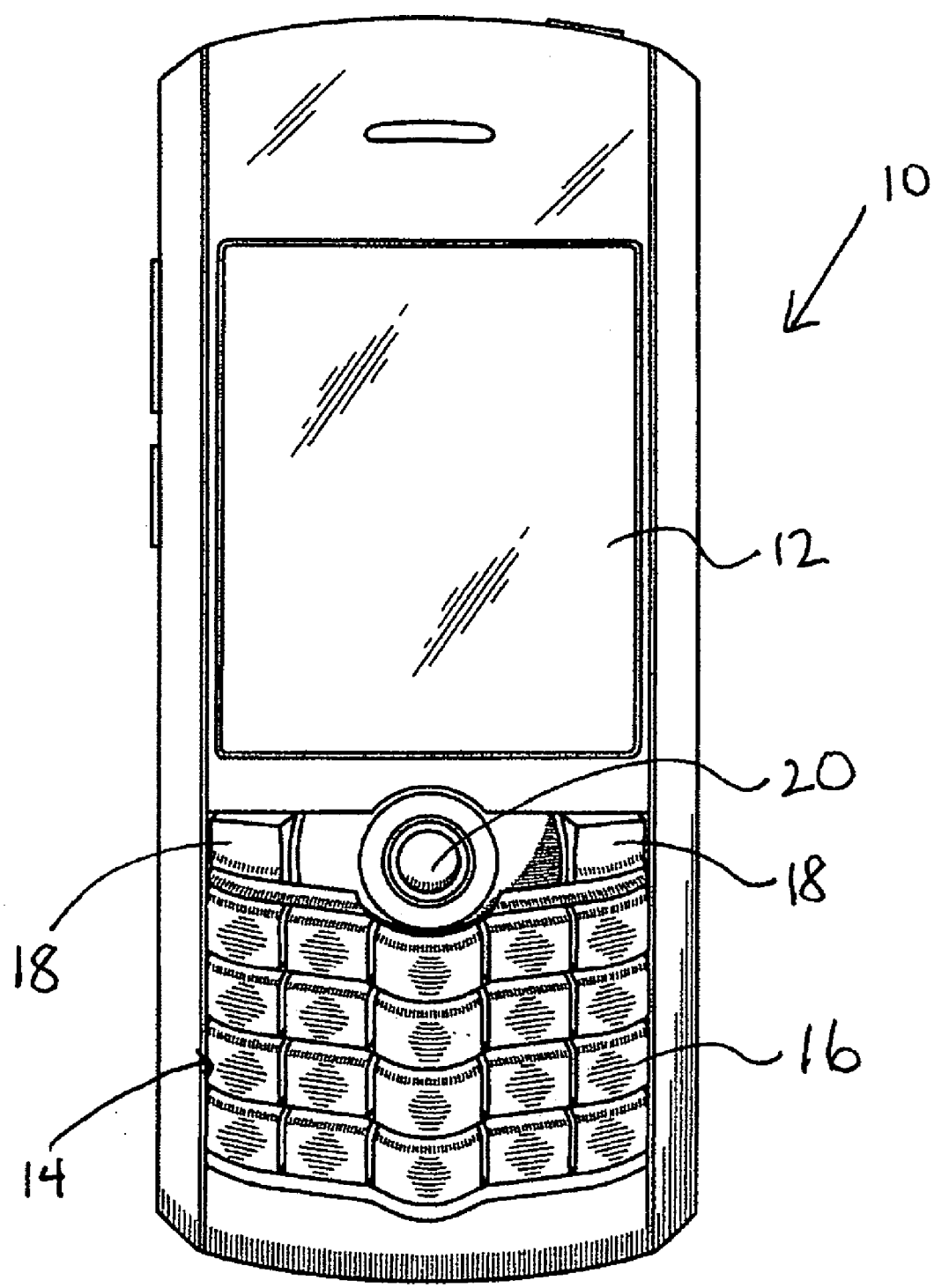
FIG. 1 is a front view of a mobile electronic device.

Turning to FIG. 1, a schematic diagram of an embodiment of a mobile communication device is shown. The mobile communication device 10 includes a display 12 along with a keyboard/keypad area 14 having a keyboard 16 installed. Between the display 12 and the keyboard 16 is a set of keys, or buttons, 18 and a trackball 20.

In one embodiment, a set of LEDs is located underneath the trackball of the mobile electronic device. As will be disclosed, the set of LEDs provide a visual indication to a user relating to a status of the mobile communication device. The LEDs may be a single colour LED or may be multi-coloured to provide a spectrum of colours. Other methods of providing visual or colour indicators to a user are also contemplated.

It will be appreciated that "colour" can be defined in many ways, for example in terms of human perception, pigments used in paint, collections of wavelengths of light, or "colour spaces". Arguably the most famous colour space for the purposes of video displays is RGB space, so named because each displayable colour is represented by the red, green and blue components (each often, but not necessarily, specified as having integer values in a range from 0 to 255) that, when added together, create a colour. However, the RGB colour space does not always conform to human expectations for a colour system. For example, adding pure red and pure green yields yellow, and the "midpoint" between pure red and green is a very dingy shade of yellow.

Many other colour spaces are known for defining colours, typically by means of three coordinates, and formulas for mapping one space to another. A system known to many who use popular graphics programs such as Photoshop™ is HSL space, in which the coordinates represent hue, saturation and luminance. Hue is measured on a circular scale corresponding to the additive colour wheel (red, yellow, green, cyan, blue, magenta). Saturation is zero for grey tones (i.e. colours having all RGB components equal) and reaches the maximum value for colours having at least one RGB component equal zero. Luminance is related to the perceived brightness of the colour, but in an inconsistent manner; for example, yellow and blue have the same luminance. There are related systems such Hue-Saturation-Value and Hue-Saturation-Brightness.

A more faithful representation of perceived brightness is found in the Y coordinate (also called luminance) of YUV space, one version of which is used in the JPEG image compression scheme. In the absence of the two chrominance coordinates U and V, pixel-by-pixel luminance information alone is all that is needed to form a blank-and-white, o.e. grey-tone, version of an image.

In varying colours to represent changes in the state of a dynamic characteristic, it is frequently advantageous—both conceptually and from a programming standpoint—to represent and transform the colours in HSL or YUV space, even though a conversion of colour coordinates to RGB values will ultimately be needed to drive a video display. As one example, a simple rotation of a hue from one value to another may involve first increasing one of the primary additive colours (red, blue and green) and then decreasing a different one. As another example, "greying-out" a graphic image by decreasing the saturation of each of its pixels typically requires simultaneously changing all three RGB values for each pixel. It will be understood that the discussion relating to the colours in the follow description may also be enhanced by these other colour characteristics or spaces.

Figure 2:
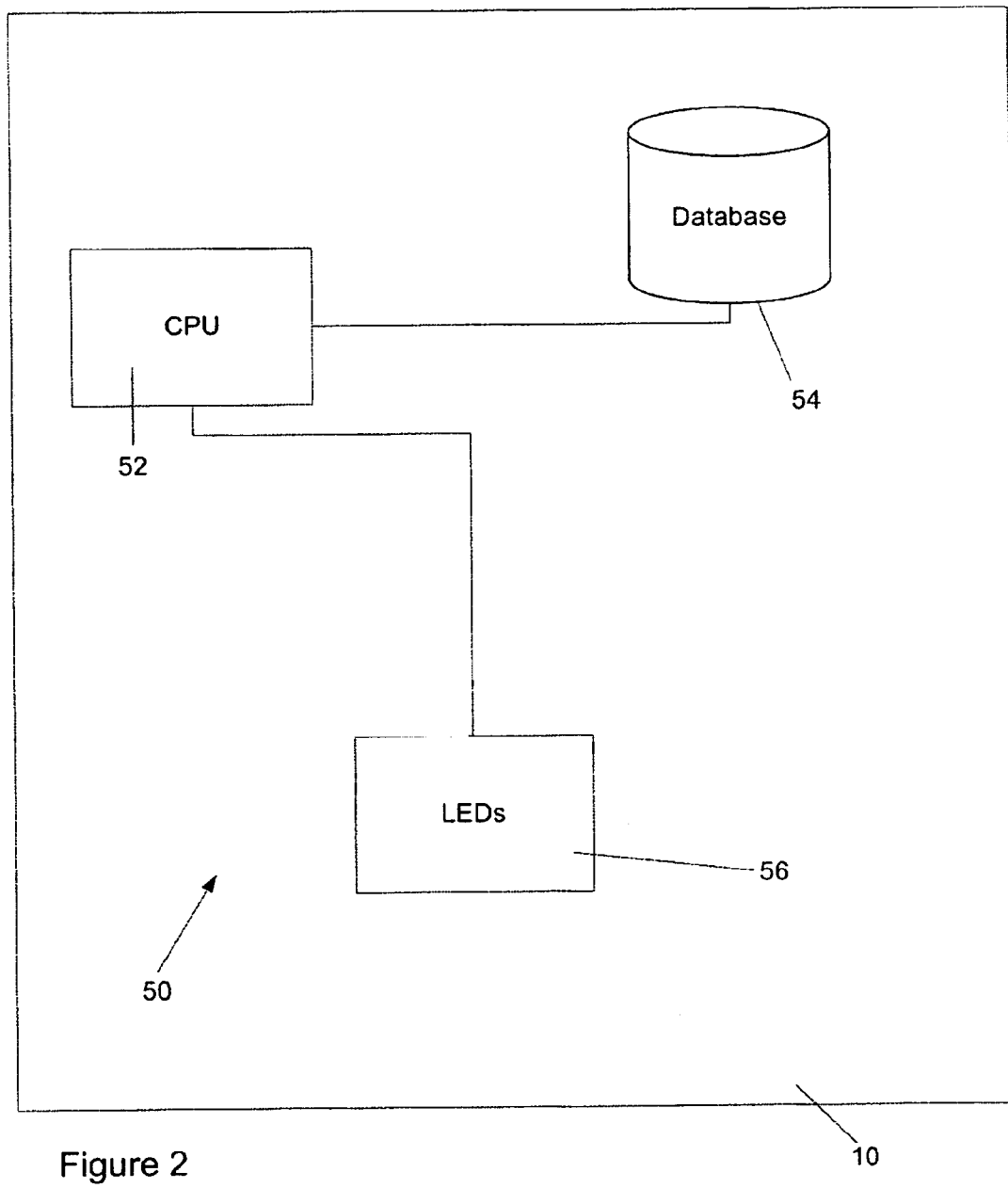
FIG. 2 is a schematic view of apparatus for indicating mobile electronic device status.
Figure 3:
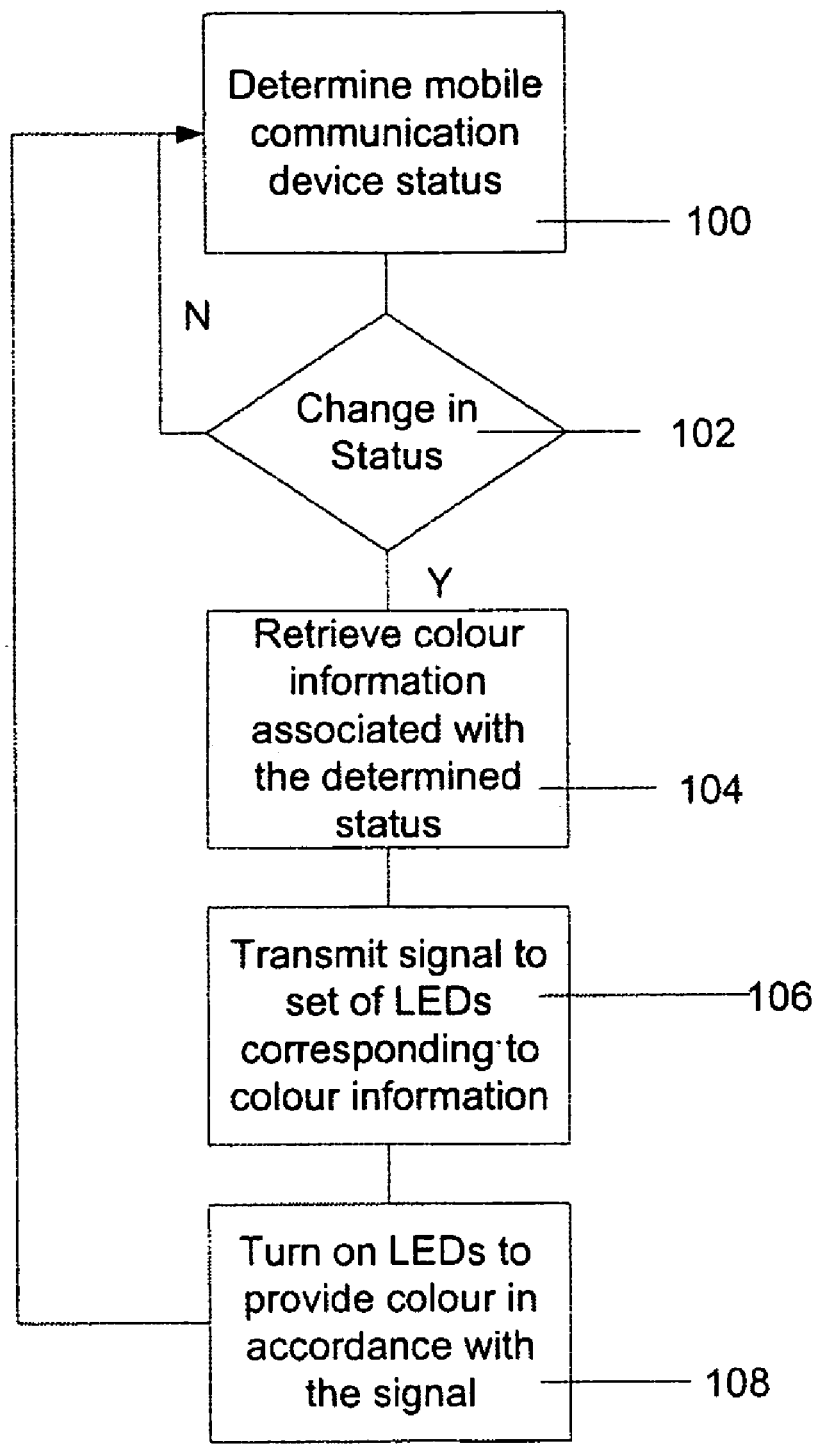
FIG. 3 is a flowchart outlining a method of indicating mobile electronic device status.

Turning to FIG. 2, apparatus for implementing a method of indicating mobile electronic device status is shown. The apparatus 50, located within the mobile electronic, or communication, device 10, includes a processor 52, which may be a mobile electronic device processor or a separate processor, a database 54 and a set of LEDs 56.

The database 54 stores information, preferably in the form of a table, which includes a list of mobile communication device statuses and a colour (or intensity of a colour) associated with each of the device statuses. The processor 52 monitors the status, or state, of the device 10 and communicates with the database 54 to retrieve the information stored in the database 54. The processor 52 also communicates with the set of LEDs 56 to transmits signals to produce a colour to illuminate the trackball. It will be understood that the area surrounding the trackball may also be illuminated by the set of LEDs as well as the area surrounding the set of buttons 18. In the following description, whenever there is mention of the trackball being illuminated, it will be understood that the area surrounding the trackball and/or the set of buttons may also be illuminated. It would be beneficial to have a means for indicating mobile communication device status or state whereby the user is provided a visual indication. This visual indication may be enhanced by an audible or tactile indicator.

In one embodiment, the apparatus 50 is designed to indicate when the trackball 20 can be used to initiate an action. In other words, the user can simply glance at the mobile electronic device to look at the colour of the light illuminating the trackball 20 to determine the state of the electronic device. In this embodiment, the set of LEDs 56 are preferably red, yellow and green with red representing a locked mode whereby use of the device is password protected, yellow representing a password mode whereby a user is entering a password in order to exit the locked mode and green representing an unlocked mode whereby the device may be used. The colours have been arbitrarily selected for this example and it will be understood that other colours may be used. The selection of red, yellow and green in the current embodiment represents traffic light colours with which a user will be more familiar. The database 54 stores the information relating to the various device statuses and the corresponding colour representing the status.

In this example, it is assumed that the mobile communication device 10 is initially in a locked mode whereby a red LED illuminates the trackball 20.

In operation, the processor 52 monitors the status of the mobile electronic, or communication, device 10 and determines that the device is in the locked mode (step 100). The processor 52 continues to monitor the mobile electronic device to determine if the status has changed (step 102). If no change is sensed, the processor 52 continues to monitor the status (step 100). When the user decides to use the device, the processor 52 senses a change in the status from the locked, or password protected, mode to the password mode. The processor 52 then accesses the database 54 (step 104) to retrieve the colour (Yellow) associated with the password mode and transmits a signal to the set of LEDs 56 (step 106) causing the LEDs to provide a yellow light to illuminate the trackball 20. The set of LEDs 56 then provide the necessary illumination to the trackball (step 108). The yellow-illuminated trackball provides a visual to the user that the mobile communication device is in the password mode. The processor 52 then returns to monitoring the status of the mobile communication device (step 100).

After the user has logged in correctly, by entering the correct password, the mobile communication device 10 is in the unlocked mode. Once the device 10 is in the unlocked mode, the user may freely access the applications within the mobile electronic device and to use the trackball. When the processor 52 senses this status change (step 102), the processor 52 accesses the database 54 (step 104) to determine the colour (Green) corresponding to the unlocked mode. The processor 52 then transmits a signal to the set of LEDs 56 (step 106) to provide a green colour to the trackball 20, indicating the unlocked mode. The green LED or LEDs are turned on (step 108) and the processor 52 then returns to monitoring and determining the mobile communication device status (step 100).

By illuminating the trackball 20 from underneath the trackball, a user is able to quickly glance at their mobile communication device 10 to determine its status which in this case is the mode in which the mobile communication device is in.

In another embodiment, the set of LEDs 56 are used to indicate different user profiles associated with the ring volume of the mobile communication device 10. In this embodiment, a single coloured LED may be used to indicate the status, however, the intensity of the illumination provides the indicator status to the user. The table below provides an example of the information stored in the database 54 for this embodiment.

| Profile | Colour Intensity |
|---|---|
| Loud | 100% |
| Vibrate | Flashing |
| Quiet | 0% |
| Default | 50% |

In operation, assuming that the mobile communication device 10 is in the default user profile, the set of LEDs 56 provides illumination at an intensity of 50% to the trackball 20. When the processor 52 senses that the user has changed their user profile (step 102), the processor 52 accesses the database 54 (step 104) to retrieve the intensity level corresponding to the new user profile. If the user profile is changed to Loud, the processor 52 retrieves the intensity level (100%) corresponding to the loud user profile and transmits a signal to the set of LEDs 56 (step 106) to provide light at an intensity of 100%. Similarly, if the new user profile is the Vibrate user profile, the LEDs receive a signal from the processor 52 to provide a flashing light to illuminate the trackball 20 and if the new user profile is Quiet, the set of LEDs is turned off so that no light is provided to illuminate the trackball 20 (step 108).

The intensities which have been selected above are for example only and are not meant to be restrictive to the implementation of the method or system. It will be understood that for this embodiment, the selected intensities must be distinguishable to the human eye such that the user can simply glance at the mobile communication device to determine the current user profile.

In yet a further embodiment, the method and apparatus are provided for indicating a status of an application on the mobile communication device. For instance, if a user has a meeting set up in a calendar application, the colour green may indicate that the user has a meeting coming up within the next hour, more specifically that there are between 10 and 60 minutes before the meeting. The colour yellow may be used to indicate that there is between 5 and 10 minutes left before the meeting. The colour red may be used to indicate that there is less than five minutes before the meeting. A flashing red light may be used to indicate that the scheduled meeting time has passed. Therefore, when the user sees a red light illuminating the trackball 20, the user knows that the meeting is starting within 5 minutes and therefore needs to proceed to the meeting in order to ensure they are not late. Although solid colours are preferred, the colours may be mixed to indicate different time frames within the ranges provided. Furthermore, different light characteristics such as saturation or intensity may be used to provide the necessary visual indication to the user.

As with the examples above, the processor 52 continuously monitors the time frame status of the meeting and accesses the database 54 whenever the time frame status has changed to retrieve the colour corresponding with the new time frame status. The new colour (or colour intensity) is then used to illuminate the trackball 20. This provides the user with a visual indicator on the face of the mobile communication device allowing the user to quickly glance at their device to determine the amount of time before their meeting or appointment or more broadly, the time frame status. There is no need for the user to look at the display to find out the exact time of day to determine the amount of time before the meeting as the colour illuminating the trackball provides a general visual indicator with the necessary information to the user in a quicker manner.

In yet a further embodiment, the method and apparatus may be used to indicate a status of the mobile communication device battery. In one example, a possible colour representation may be if the battery has a battery life of 50% or more, the set of LEDs provides a green light, if the battery has a battery life of between 15 and 50%, the set of LEDs provides a yellow light and if the battery has a battery life of less than 15% (indicating a need for recharging), the set of LEDs provides a red light.

It will be understood that other mobile communication device statuses and states such as connectivity or email status may also be displayed using the methods and apparatuses described in this specification.

Along with visual indications, the mobile electronic device may also provide audible or tactile indicators to enhance the method and system. For example, tactile indicators such as altering the temperature of the device to indicate device state, or status to a user. Also, vibration of the mobile communication device or the provision of a message on the display may be provided to enhance the visual indicators.

In an alternative embodiment, the illumination of the trackball 20 may be used to indicate one mobile communication device status, or state, such as the device state, the illumination of the area surrounding the trackball 20 may be used to indicate a second mobile communication device status, or stat, such as user profile information while the illumination of the area surrounding the set of buttons 18 may be used to indicate a third mobile communication device status, or state, such as the battery level. Depending on the number of areas available for illumination, any number of different mobile communication device statuses may be displayed for the user.

In a further embodiment, instead of constantly monitoring the mobile communication device status, each time a status changes, a signal may be transmitted to the processor 52 indicating the change thereby causing the processor 52 to access the database 54 for the colour information, or indicator information. In this manner, the processor does not have to constantly monitor the status of the mobile communication device.

In yet a further embodiment, the indicators may be associated with any type of user input apparatus and is not restricted to simply a trackball. For instance, the button area or under the keys of the keypad/keyboard.

The above-described embodiments are intended to be examples only. Alterations, modifications and variations may be effected to the particular embodiments by those of skill in the art without departing from the scope, which is defined solely by the claims appended hereto.

What is claimed is:

1. A method of indicating a user profile associated with a ring volume status of a mobile electronic device comprising:
assigning colour intensity level information for each ring volume status in said user profile;
retrieving said colour intensity level information;
illuminating a trackball or an area surrounding the trackball of said mobile electronic device with an intensity of said colour representative of said colour intensity level information to provide an indication of said ring volume status;
determining a change in the user profile associated with the ring volume status;
retrieving an updated colour intensity level information associated with said changed user profile; and
illuminating said trackball or said area surrounding the trackball with an intensity of said colour representative of said updated colour intensity level information associated with said changed user profile;
wherein said colour and updated colour intensity level information and user profiles are stored in a table; and
wherein the illumination is via a set of light emitting diodes (LEDs) including single-coloured LEDs.

2. The method of claim 1 further comprising, occurring after said step of retrieving:
transmitting a signal, representative of said colour intensity level information, to the set of LEDs.

3. The method of claim 2 wherein said step of retrieving comprises:
searching a database for said colour intensity level information.

4. The method of claim 3 further comprising:
activating audible or tactile indicators associated with the ring volume status.

5. The method of claim 2 further comprising:
activating audible or tactile indicators associated with the ring volume status.

6. The method of claim 1 wherein said step of retrieving comprises:
searching a database for said colour intensity level.

7. The method of claim 6 further comprising:
activating audible or tactile indicators associated with the ring volume status.

8. The method of claim 1 further comprising:
activating audible or tactile indicators associated with the ring volume status.

9. Apparatus for indicating a user profile associated with a ring volume status of a mobile electronic device comprising:
a set of light emitting diodes (LEDs) located at a trackball or at an area surrounding the trackball;
apparatus adapted to transmit a signal including colour intensity level information used to indicate said ring volume status to said set of LEDs;
wherein said set of LEDs is adapted to provide illumination at an intensity level corresponding to said colour intensity level information to illuminate said trackball or said area surrounding the trackball of said mobile communication device to indicate said ring volume status;
apparatus for determining a change in the user profile associated with the ring volume status; and
apparatus for retrieving an updated colour intensity level information associated with said changed user profile and transmitting a signal comprising said updated colour intensity level information associated with said changed user profile to said set of LEDs;
wherein said set of LEDs is adapted to illuminate said trackball or said area surrounding the trackball with an intensity of said colour representative of said updated colour intensity level information associated with said changed user profile;
wherein said colour and updated colour intensity level information and user profiles are stored in a table; and
wherein said set of LEDs includes single-coloured LEDs.

10. The apparatus of claim 9 wherein said set of LEDs comprises at least one LED.

11. The apparatus of claim 9 further comprising an audible or tactile indicator adapted to provide an audible or tactile signal indicative of said ring volume device status.

12. A mobile electronic device having an apparatus for indicating a user profile associated with a ring volume status of a mobile electronic device according to claim 9.

* * * * *